Figure 1:
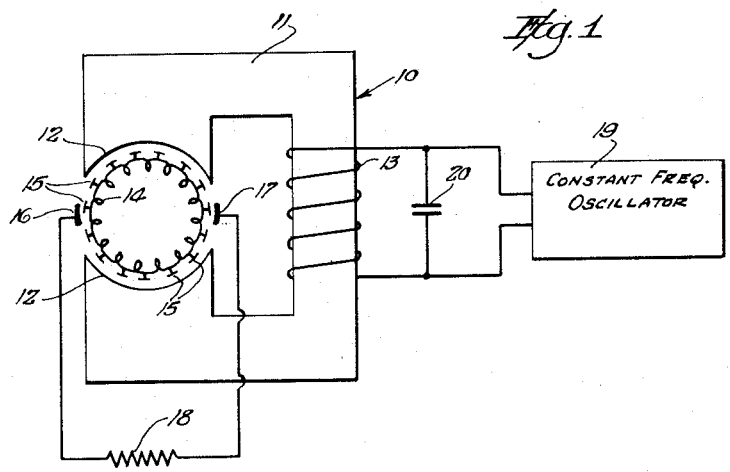

Oct. 31, 1950 — E. P. BUCKTHAL — 2,528,111

ALTERNATING-CURRENT GENERATOR

Filed April 19, 1946

Inventor:
Elmer P. Buckthal

Patented Oct. 31, 1950

2,528,111

UNITED STATES PATENT OFFICE 2,528,111

ALTERNATING-CURRENT GENERATOR

Elmer P. Buckthal, Brookfield, Ill., assignor to United Air Lines, Inc., Chicago, Ill., a corporation of Delaware Application April 19, 1946, Serial No. 663,276

8 Claims. (Cl. 322—61)

This invention relates to alternating-current generators, more particularly to dynamo-electric machines for generating alternating currents of constant frequency regardless of variations in the speed of rotation, and the invention has for an object the provision of constant-frequency alternating-current generators of this character.

In the usual dynamo-electric machines employed for generating alternating currents, the frequency of the generated voltages and currents is a function of the rotational speed of the rotor of the machine and therefore varies when the machine is driven from a variable-speed prime mover. Difficulties in providing constant-frequency alternating current are thus encountered in installations utilizing variable-speed prime movers, such, for example, as the variable speed engines employed in aircraft and similar vehicles. Known types of vacuum tube oscillators or similar static type generators have inherent limitations as to the maximum power output obtainable, and the use of rotating type generators is therefore desirable. Accordingly, it is a further object of this invention to provide a rugged and inexpensive dynamo-electric machine capable of delivering large outputs of alternating-current energy at a constant frequency which is unaffected by the speed of rotation of the machine.

In carrying out the invention in one form I provide a dynamo-electric machine having the field and armature structures of a conventional direct-current generator, together with means for exciting the field structure of the machine with an alternating current of the desired frequency.

Figure 2:
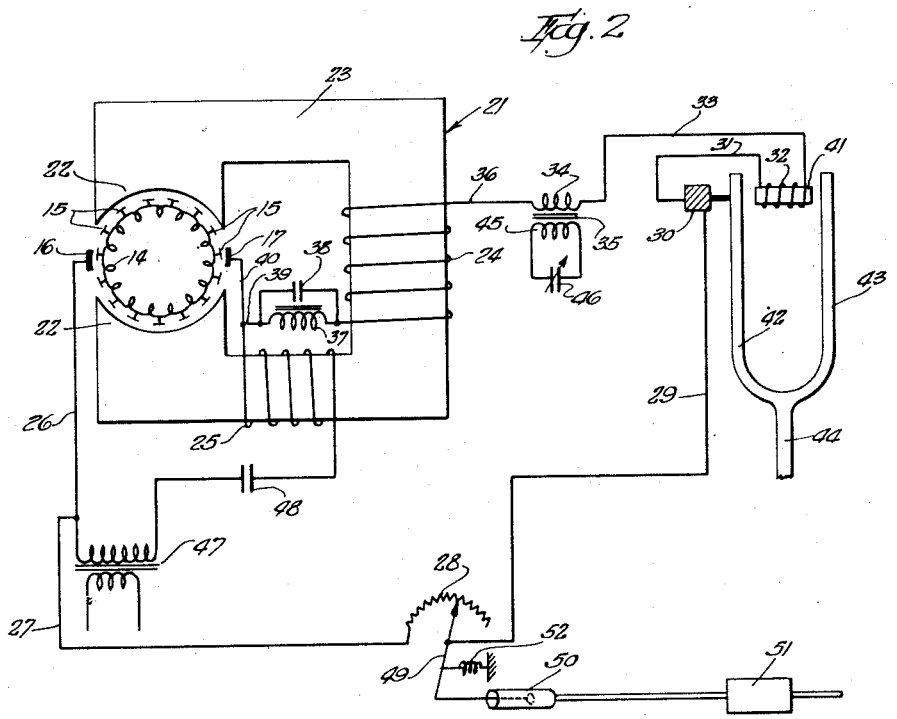

For a more complete understanding of the invention reference should now be had to the drawing, in which:

Fig. 1 is a diagrammatic representation of a constant-frequency alternating-current generator embodying the present invention; and Fig. 2 is a similar diagrammatic representation of a supply system including a dynamo-electric machine constituting another embodiment of the invention and adapted for self-excitation.

Referring first to Fig. 1 of the drawing, I have shown the invention as embodied in a dynamo-electric machine 10 having the field and armature structures of a conventional direct-current generator. As shown, the machine 10 comprises a field structure or core 11 provided with opposed pole pieces 12 and an exciting field winding 13. Adapted to rotate between the pole pieces 12 is an armature having a winding 14 which is connected, as shown, to suitable commutator bars 15 adapted to be engaged by the usual collectors or brushes 16 and 17. Although any conventional type of armature winding may be employed, the winding 14 is conventionally shown as of the ring or lap-wound type connected to a large number of commutator bars so as to provide a structure having essentially the same number of coils disposed opposite the pole pieces 12 regardless of the position of the armature. The brushes 16 and 17 are connected, as shown, to any suitable load circuit adapted for the utilization of alternating current, which load circuit is represented by a resistor 18. The excitation for the field winding 13 is supplied, in accordance with the present invention, from a suitable source 19 of alternating current of constant frequency which may comprise a suitable vacuum tube oscillator or other low-power static-type constant-frequency generator. In order to insure that a constant-frequency current of sufficiently high magnitude is maintained in the field winding 13, a condenser 20 is connected across the winding 13 in parallel relation thereto, the respective impedances of the winding 13 and the condenser 20 being adjusted to provide a resonant condition at the desired frequency.

In analyzing the operation of the dynamo-electric machine 10 when excited with alternating current of constant frequency, reference may best be had to the well-recognized operation and principles of a conventional direct-current generator. As is well understood in the art, rotation of the armature of a direct-current generator with zero field excitation will produce zero voltage at the brushes of the machine. If the field excitation is gradually increased the voltage appearing at the brushes of the machine comprises a direct-current voltage (disregarding the ripple component due to the commutator bars) the magnitude of which increases directly in proportion to the increase in the field excitation. If the magnitude of the field excitation is now decreased to zero the generator output-voltage likewise decreases, and if the field excitation is reversed and gradually increased in the opposite direction the output-voltage correspondingly increases with reversed polarity.

Accordingly, it will be apparent that if the exciting current flowing in the field winding 13 is caused to fluctuate from zero to a given maximum as a repetitive function, the field flux produced thereby will likewise fluctuate and the output-voltage at the brushes of the generator will vary in accordance with the same function. By applying to the field winding 13 a sinusoidal alternating current of the frequency desired there is obtained in the output circuit of the dynamo-electric machine a sinusoidal alternating current of the same frequency. Variations in the speed of rotation of the armature will cause corresponding variations in the magnitude of the output-voltage, but the frequency of the variation of the voltage remains a function of the current flowing in the field winding 13. Accordingly, the dynamo-electric machine 10, when excited with an alternating current of the desired constant frequency, produces in the output circuit thereof a constant-frequency alternating current regardless of variations in the speed of rotation of the armature.

In Fig. 2 there is illustrated a dynamo-electric machine 21 constituting another embodiment of the invention arranged for self-excitation and connected in a generating system adapted to supply constant-frequency alternating current at a substantially constant voltage, regardless of the rotational speed of the machine. In this embodiment of the invention the armature winding, the commutator structure and the collector-brushes are identical with and are identified by the same reference numerals as the corresponding parts of the dynamo-electric machine 10 of Fig. 1. The armature carrying the winding 14 is rotatable between the pole pieces 22 of a field structure or core 23 provided with a pair of field windings 24 and 25, the structure being identical with the conventional structure employed in compound-wound direct-current generators. The field winding 24 is connected in shunt circuit relation across the output terminals or brushes 16 and 17 of the armature winding through a circuit which may be traced from the brush 16, through conductors 26 and 27, variable resistor 28, conductor 29, a compressible carbon-button or carbon-pile resistor 30 of a type well known in the art, a conductor 31, electromagnet winding 32, a conductor 33, the primary winding 34 of a transformer 35, a conductor 36, the field winding 24, a tank or resonant circuit comprising an inductance 37 and a condenser 38, and by way of the conductors 39 and 40 to the opposite brush 17. The electromagnet winding 32 is associated with a magnetic core 41 disposed between the arms 42 and 43 of a vibratory tuning fork 44, the arm 42 being arranged to bear against the compressible carbon-button 30 for a purpose which will now be described.

With the field and armature connections thus far described, rotation of the armature winding 14 causes a small direct-current voltage to be generated therein due to the residual magnetism in the field structure 23, which voltage causes direct current to flow through the shunt field circuit just described, the field winding 24 thus creating a greater flux density between the pole pieces 22, which in turn results in a higher generated voltage. Thus a direct-current voltage is built up in the dynamo-electric machine in precisely the same manner that a shunt-excited direct-current generator builds up direct-current voltage when the armature is rotated.

When the direct current flowing in the shunt field circuit reaches a predetermined magnitude the pull exerted by the electromagnet comprising the coil 32 and the core 41 on arm 42 of the tuning fork 44 will cause the arm 42 to move away from the carbon-button 30 so as to increase the resistance in the shunt field circuit, it being understood that the arm 42 of the tuning fork is formed of magnetic material, although if desired this arm 42 may be formed of other material and provided with a magnetic pole piece adjacent its upper end.

The increase of the resistance of the carbon-button 30 thus produced will cause a corresponding decrease in the current flow in the shunt field circuit, and the reduced pull exerted by the electromagnet core 41 as a result of the decrease in current permits the arm 42 of the tuning fork to return to its normal position so as again to compress the carbon-button and reduce the resistance thereof to its normal value. This operation of the tuning fork 44 continues in a repetitive cycle at a frequency controlled by the resonant frequency of the tuning fork 44, and consequently pulsating direct current, that is, an exciting current having a direct-current and an alternating-current component, is supplied to the field winding 24 which, in accordance with the principles set forth in the description of Fig. 1, causes a voltage having an alternating-current component to appear at the brushes of the dynamo-electric machine.

In order that the alternating component of the pulsating field-current may be adjusted to phase coincidence with the vibrations of the tuning fork 44, the secondary winding 45 of the transformer 35 is connected in circuit with a variable condenser 46. As will be apparent to those skilled in the art, the phase relation of the current flowing in the field circuit may be varied by adjustment of the condenser 46 in order to produce the desired coincidence of phase relation between the current alternations and the tuning fork vibrations. The resonant circuit, comprising the inductance 37 and the condenser 38, is arranged to resonate at the frequency of excitation provided by the tuning fork 44 to insure that only the desired frequency component flows in the field winding 24.

Thus there is produced, in accordance with the present invention, a dynamo-electric machine for generating alternating currents of constant frequency regardless of the speed of the rotation of the armature, the machine being arranged for self-excitation, and it will be apparent that the alternating component produced at the brushes of the machine may be used for energization of any suitable alternating-current load, such for example as the transformer 47. In many electrical systems it is desirable to supply both alternating current and direct current, and an important advantage of the construction illustrated in Fig. 2 lies in the fact that a direct current may be taken from the brushes of the machine merely by connecting the direct-current load thereto through suitable blocking impedances which will permit only the direct-current component of the output to flow through the direct-current circuit. Likewise the alternating-current load may be connected to the brushes through suitable blocking condensers which will permit only the alternating-current component to flow in the alternating-current circuit.

As heretofore stated, the dynamo-electric machine 21 of Fig. 2 is illustrated as embodied in a generating system capable of supplying not only constant-frequency but also substantially constant-voltage alternating current. In order to compensate for voltage changes tending to result from variations in the load supplied by the machine, the field winding 25 of the machine is connected, as shown, in series with the load transformer 47 through a power-factor-correcting condenser 48 which serves not only to block the flow of direct current through the field winding 25, but also to maintain the alternating-current component in the winding 25 in phase with the component in the winding 24.

In order to render the output voltage of the dynamo-electric machine 21 substantially independent of the speed of rotation of the armature, automatic regulating means similar to conventional means heretofore provided for use with direct-current generators may be employed. Thus, as shown in Fig. 2, the variable resistor 28 is included in the shunt field circuit, as heretofore traced, and the adjustable arm 49 of this resistor is arranged to be operated by a suitable hydraulic ram 50, the piston of which is actuated by oil pressure developed by a pump 51 driven by the same prime mover as the generator. As shown, a spring 52 is arranged to oppose the movement of the arm 49 in response to an increase in the oil pressure, the arrangement of the various parts being such that as the speed of the prime mover and the generator increases, the oil pressure likewise increases thereby moving the arm 49 of the resistor in a direction to increase the resistance in the shunt field circuit and thereby reduce the field excitation. A reduction of the speed of the prime mover, resulting in a decrease in the oil pressure, enables the spring 52 to actuate the arm 49 in a reverse direction and decrease the resistance in the field circuit, thereby increasing the field flux produced by the winding 24. By thus controlling the shunt field excitation according to the speed of rotation, the desired voltage regulation is achieved.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. An alternating-current generator comprising a dynamo-electric machine having the field and armature structures, including the windings, of a conventional self-excited direct-current generator, means connecting a field winding of said machine in shunt circuit relation to the armature thereof, and means in said shunt field circuit responsive to the direct current initially built up in said armature and field circuits by the residual magnetism of said field structure for varying at a constant frequency the resistance of said shunt circuit whereby a pulsating exciting current of constant frequency is supplied to said field winding to produce in the armature output circuit of said machine an alternating-current component at said constant frequency.

2. An alternating-current generator comprising a dynamo-electric machine having the field and armature structures, including the windings, of a conventional self-excited direct-current generator, means connecting a field winding of said machine in shunt circuit relation to the armature thereof, means in said shunt field circuit responsive to the direct current initially built up in said armature and field circuits by the residual magnetism of said field structure for varying at a constant frequency the resistance of said shunt circuit whereby a pulsating exciting current of constant frequency is supplied to said field winding to produce in the armature output circuit of said machine an alternating-current component at said constant frequency, and tunable impedance means in said shunt field circuit for resonating said circuit at said frequency and adjusting the phase of the pulsating component therein.

3. An alternating-current generator comprising a dynamo-electric machine having the field and armature structures, including the windings, of a conventional self-excited direct-current generator, means connecting a field winding of said machine in shunt circuit relation to the armature thereof, means in said shunt field circuit responsive to the direct current initially built up in said armature and field circuits by the residual magnetism of said field structure for varying at a constant frequency the resistance of said shunt circuit whereby a pulsating exciting current of constant frequency is supplied to said field winding to produce in the armature output circuit of said machine an alternating-current component at said constant frequency, said resistance varying means including a tuning fork for controlling the frequency of variation, and tunable impedance means in said shunt circuit for adjusting the phase of the pulsating-current component therein to coincide with the vibrations of said tuning fork.

4. An alternating-current generator comprising a dynamo-electric machine having the field and armature structures, including the windings, of a conventional compound-wound direct-current generator, means connecting one field winding of said machine in shunt circuit relation to the armature winding thereof, means in said shunt circuit responsive to the direct current initially built up in the armature and field circuits by the residual magnetism of the field structure for varying at a constant frequency the resistance of said shunt circuit whereby a pulsating exciting current of constant frequency is supplied to said field winding to produce in the armature output circuit of said machine an alternating-current component at said constant frequency, means connecting a second field winding of said machine in series circuit relation in said armature output circuit for energizing said field structure in accordance with said alternating-current component, and means in said series circuit for maintaining in coincident phase the constant-frequency components in said shunt and series field circuits.

5. The method of producing a constant-frequency alternating current from a dynamo-electric machine having the construction of a shunt-excited direct-current generator, which method comprises causing said machine to build up a direct-current voltage by virtue of the residual magnetism of the field structure, and varying at the desired frequency the impedance of the shunt-field circuit to introduce into the field winding of said machine a pulsating exciting current having an alternating component of said desired frequency.

6. An alternating-current generator comprising a dynamo-electric machine having the field and armature structures, including the windings, of a conventional compound-wound direct-current generator, means connecting one field winding of said machine in shunt circuit relation to the armature winding thereof, means in said shunt circuit responsive to the direct current initially built up in the armature and field circuits by the residual magnetism of the field structure for varying at a constant frequency the resistance of said shunt circuit whereby a pulsating exciting current of constant frequency is supplied to said field winding to produce in the armature output circuit of said machine an alternating-current component at said constant frequency, and means connecting a second field winding of said machine in series circuit relation in said armature output circuit for energizing said field structure in accordance with said alternating-current component.

7. An alternating-current generator comprising a dynamo-electric machine having the field and armature structures, including the windings, of a conventional compound-wound direct-current generator, means connecting one field winding of said machine in shunt circuit relation to the armature winding thereof, means for causing a pulsating exciting current of constant frequency to be supplied to said shunt field winding to produce in the armature output circuit of said machine an alternating-current component at said constant frequency, means connecting a second field winding of said machine in series circuit relation in said armature output circuit for energizing said field structure in accordance with said alternating-current component, and means in said series circuit for maintaining in coincident phase the constant-frequency components in said shunt and series field circuits.

8. An alternating-current generator comprising a dynamo-electric machine having the field and armature structures, including the windings, of a conventional compound-wound direct-current generator, means connecting one field winding of said machine in shunt circuit relation to the armature winding thereof, means for causing a pulsating exciting current of constant frequency to be supplied to said shunt field winding to produce in the armature output circuit of said machine an alternating-current component at said constant frequency, and means connecting a second field winding of said machine in series circuit relation in said armature output circuit for energizing said field structure in accordance with said alternating-current component.

E. P. BUCKTHAL.

REFERENCES CITED

The following references are of record in the file of this patent:

UNITED STATES PATENTS

| Number | Name | Date |
|---|---|---|
| 783,708 | Stanley | Feb. 28, 1905 |
| 1,673,598 | Slepian | June 12, 1928 |
| 1,822,232 | Meyer-Berg et al. | Sept. 8, 1931 |
| 2,460,714 | Roys | Feb. 1, 1949 |

FOREIGN PATENTS

| Number | Country | Date |
|---|---|---|
| 173,317 | Great Britain | Dec. 28, 1921 |
| 560,180 | Great Britain | Mar. 23, 1944 |